Dec. 9, 1969 H. J. PIOTROWSKI 3,483,335

EQUALIZER CIRCUITY UTILIZING PHOTORESISTORS

Filed Nov. 4, 1966 2 Sheets-Sheet 1

INVENTOR
HENRY JULIUS PIOTROWSKI
BY
ATTORNEY

EQUALIZER CIRCUITY UTILIZING PHOTORESISTORS

Filed Nov. 4, 1966 2 Sheets-Sheet 2

United States Patent Office 3,483,335

Patented Dec. 9, 1969

3,483,335
EQUALIZER CIRCUITRY UTILIZING PHOTORESISTORS

Henry Julius Piotrowski, Raleigh, N.C., assignor to International Telephone and Telegraph Corporation Filed Nov. 4, 1966, Ser. No. 592,015
Int. Cl. H04b 3/38
U.S. Cl. 179—170 5 Claims

ABSTRACT OF THE DISCLOSURE

Equalizer circuitry utilizing photoresistors having resistances that vary as a function of the intensity of a beam of light. The lamp providing the beam of light is energized by the amplifier output of the equalizer. The light variations cause the value of the photoresistor to decrease the insertion loss of the equalizer circuit when the intensity of the light drops and vice versa. This negative feedback provides constant attenuation regardless of the frequency range of the signals.

The invention relates to equalizers for use in communication systems and more particularly to circuits for controlling equalization in repeaters.

Equalizers are used in association with repeaters in the long lines of telephone systems to compensate for the attenuation of the lines to currents of different frequencies. Thus, equalizers comprise networks of inductors, capacitors and resistors proportioned and arranged to complement the attenuation-frequency characteristics of the line so as to maintain a constant attenuation frequency characteristic.

Theoretically, the equalizers cause the attenuation of the lines to be equal at all frequencies within the transmission band. In practice, however, the attenuation-frequency characteristic of the line is compensated for only at a certain temperature because the frequency-attenuation characteristic of the lines change with temperature. When the line characteristic changes, for example, due to ambient temperature changes or even due to ambient humidity changes, the equalizer circuit does not vary proportionately. Accordingly, the equalizer fails to completely compensate for the changed attenuation-frequency characteristic of the line. The varying attenuation of the line to the currents of different frequencies naturally decreases the intelligibility of the telephone conversation.

Accordingly, an object of the present invention is to provide equalization circuitry capable of compensating for varying line attenuation frequency characteristics.

A more specific object of the present invention is to provide means for controlling equalizers to vary the attenuation frequency characteristics so as to compensate for the varying line attenuation characteristic.

Another object of the invention is to provide equalizers equipped to equalize the attenuation-frequency characteristics of lines despite the change in the characteristics caused by changed ambient conditions.

Yet another object of the invention is to provide a multiple output control device for changing the characteristics of more than one equalizer circuit according to the changed characteristics of a single line.

In accordance with one aspect of the present invention, a repeater is equipped with an equalizer having a photoresistor therein whose resistance is varied by the intensity of a light beam. The lamp providing the light is energized by tapping the output of the equalizer. When the resistance of the photoresistor increases, the output of the equalizer increases and therefore the intensity of the light increases. When the resistance of the photoresistor decreases, the decreased equalizer output causes the intensity of the light to decrease. The light variation causes the value of the photoresistor to vary to decrease the insertion loss of the equalizer circuit when the intensity of the light drops and vice-versa.

The above mentioned and other features of this invention and the manner of obtaining them will become more apparent, and the invention itself will be best understood by reference to the following description of an embodiment of the invention taken in conjunction with the accompanying drawings, in which.

Figure 1:
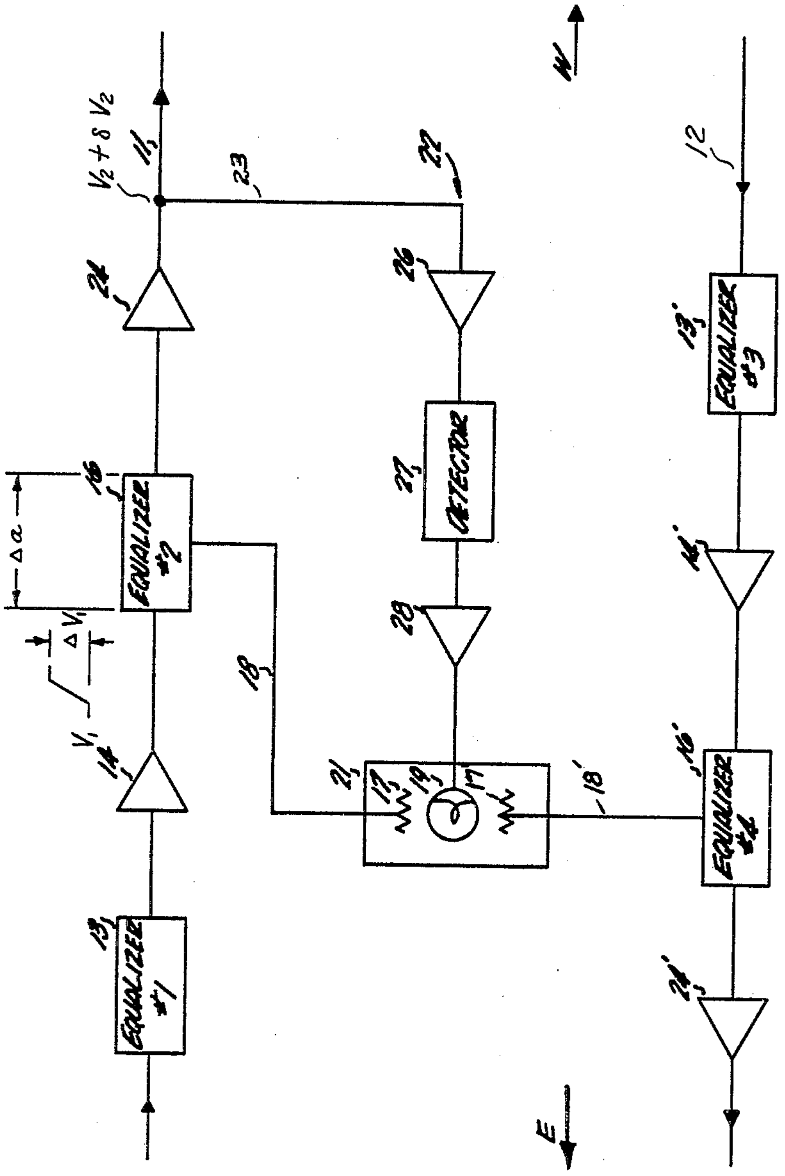
FIG. 1 is a block diagram of a repeater using the inventive equalizer control circuitry.

The repeater of the block diagram of FIG. 1 is shown as being in a cable that extends from a central office at the east indicated by an arrow under the upper case letter E on the left hand side of the paper, to another central office, subscriber or repeater station at the west as indicated by the arrow under the upper case W on the right hand side of the paper. The upper cable 11 carries the communications from east to west, while the lower cable 12 is equipped to carry the communications from west to east.

In carrier type circuit means, such as any well known equalizer circuit, are provided to compensate for the variations in the cable impedance versus frequency characteristic at some predetermined average temperature.

Block 13 represents such a normally used equalizer circuit. The operation of this equalizer is well known to those skilled in the art.

Block 14 represents a pre-amplifier for increasing the amplitude of the signal received from equalizer 13. The amplification provided by the pre-amplifier 14 at least partially compensates for the attenuation inherently inserted into the circuitry by the use of equalizer 13, and provides a separation of equalizers 13 and 16.

Means are provided for varying the equalization with changes in the attenuation-frequency characteristics of the line, such as may be caused by changes in the ambient environmental conditions of the lines. More specifically, another equalizer 16 is provided. One of the elements of equalizer 16 is a photo sensitive resistor 17 attached to equalizer 16 by lead 18. The resistance of the photo sensitive resistor 17 varies as a function of the intensity of light shining on it.

Means, such as lamp 19, are provided for activating the photo sensitive resistor of equalizer 16. The resistance of the element 21 varies as a function of the intensity of the light emanating from lamp 19.

Mounting means, such as housing 21, are provided for holding the lamp in a fixed relation to the photo sensitive resistors. The housing is capable of mounting a plurality of photo sensitive resistors to receive light from the single lamp.

Means, such as feedback circuit 22, are provided for feeding back a portion of the output current in use in energizing the lamp 19. Thus, the lamp photoresistor combination is closed loop feedback control for equalizer 16. More specifically, feedback circuit 22 comprises lead 23 connected to the output of an amplifier 24. Amplifier 24 amplifies the output of equalizer 16 to compensate for the attenuation added by the equalizer circuitry. The output of amplifier 24 connects to the west end of cable 11.

Lead 23 connects the west and output of the repeater, that is the output of amplifier 24, to control amplifier 26 in feed-back circuit 22. Means are provided for converting the signal of cable 11 to a lamp energizing signal. More particularly, the output of the control amplifier is coupled to detector 27 which provides a direct current power signal output. The direct current output of the detector is amplified in D.C. amplifier 28.

It should be noted that it is within the scope of the invention to use only one equalizer, such as equalizer 16, instead of the two equalizers (13, 16) shown. By using two equalizers as shown, the controlled equalizer 16 acts as a vernier in conjunction with the uncontrolled equalizer 13.

The portion of the repeater in the bottom cable which is carrying information from west to east is equipped with same sort of circuitry as found in the portion of the repeater in the upper cable 11 except it is not provided with a feedback loop. The similar equipment is identified herein with the same numbers used in identifying the equipment of cable 11 except that the numbers are primed. Thus, cable 12 on the western end of the repeater is connected into an equalizer 13'. The output of equalizer 13' is amplified by amplifier 14' and fed to controlled equalizer 16'. The output of equalizer 16' is amplifier 24' and delivered at th eeast end of the cable.

The control of equalizer 16' is accomplished by the variations of the resistance in the photo sensitive resistor 17'. The variation in resistor 17' are a function of the variations in the light intensity of lamp 19.

The cables 11, 12 are actually bound together and hence, are exposed to the same ambient condition. Thus, when the controlled equalizer is used to compensate for changes in line characteristics caused by changes in ambient conditions only one feedback circuit is necessary.

Figure 2:
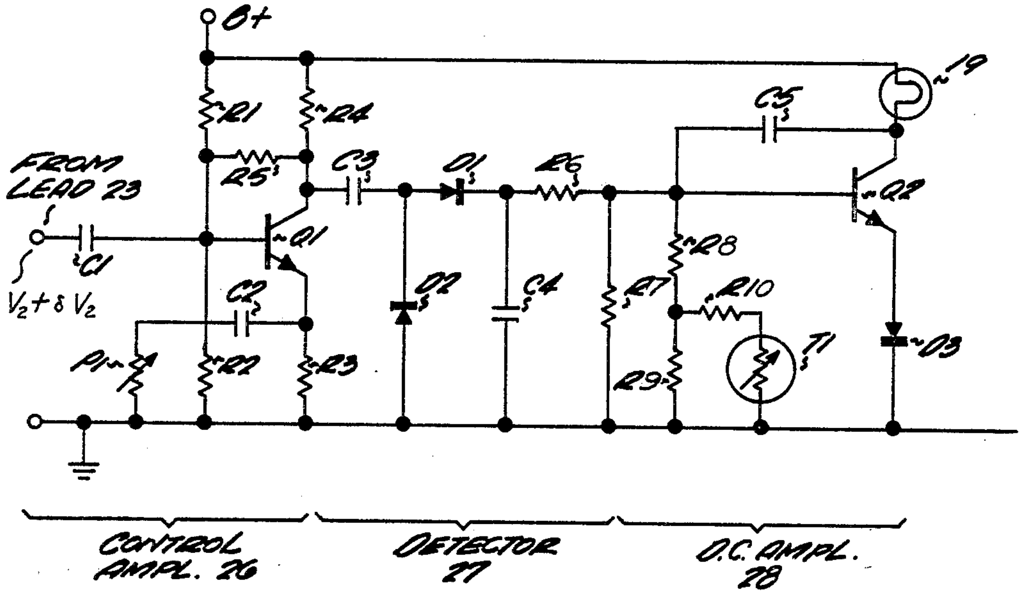
FIG. 2 is a schematic of the lamp driving circuitry, shown in block diagram form in FIG. 1.

The feedback circuit 22 is shown schematically in FIG. 2. More specifically, in FIG. 2 the control amplifier 26, the detector 27 and the D.C. amplifier 28 are shown in schematic detail.

The control amplifier 26 comprises means such as NPN transistor Q1 for amplifying a portion of the output of the main amplifier 24. The sample of the main amplifier output is received over lead 23 and coupled to the base of the transistor Q1 through coupling capacitor C1.

The base of transistor Q1 is base biased by its connection to the junction point of resistors R1, R2 which comprise a voltage divider network. More specifically, the resistors R1, R2 are connected in series between B+ battery and B− battery or ground.

The emitter of transistor Q1 is coupled to ground through emitter bias resistor R3; while the collector of transistor Q1 is connected to positive battery through load resistor R4. The control amplifier 26 uses two stabilizing circuits. For example, feedback resistor R5 couples the collector to the base of the transistor Q1 to provide negative feedback to the input of the amplifier. This negative feedback is particularly advantageous for counteracting adverse temperature effects.

In addition, emitter bias resistor R3 is bridged by a series circuit comprising bypass capacitor C2 and potentiometer P1. This series path provides adjustable A.C. feedback. The amount of current by-passed is controlled by potentiometer P1. The setting of potentiometer P1 also controls the gain of control amplifier 26.

The output of control amplifier 26 is coupled through a coupling capacitor C3 to the full wave detector circuit 27. The detector 27 comprises diodes D1, D2 connected in a full wave detection configuration. In greater detail, the anode of D1 is coupled to capacitor C3 while the cathode of diode D2 is connected to capacitor C3. The cathode of diode D1 is connected to the ripple filter capacitor C4. The anode of D2 is connected to ground or positive voltage. The other side of filter capacitor C4 is also connected to ground.

The output of the detector 27, that is the junction of the cathode of diode D1 and capacitor C4 is connected to a voltage divider circuit comprising resistors R6, R7 which are series connected to ground.

The junction point of resistors R6, R7 of the voltage divider network are coupled directly to the base of the D.C. amplifier comprising NPN transistor Q2. Base bias for transistor Q2 is obtained through the series resistors R8, R9 which connect the base of transistor Q2 to ground. Resistor R9 is bridged by the series connection of resistor R10 and thermistor R10 and thermistor T1. The bridging circuit is designed to aid in temperature stabilizing the D.C. amplifier. The diode D3 in the emitter circuit introduces local D.C. feedback. The resistance of the diode D3 decreases very quickly with the increase of current in transistor Q2. This decrease of resistance of diode D3 provides a reduction of local feedback (i.e. current increases in transistor Q2) causing an increase of input level; thus, the gain of D.C. amplifier 28 in non-linear. For small variation of input level at the base of transistor Q2, the variation of the lamp current is considerable, and the variation of illumination produced by the lamp becomes very significant. Thus, the photo-resistance varies very strongly for small variations of input level.

The collector of transistor Q2 is connected to the negative battery through the filament of lamp 19. Thus, the energizing current for the lamp passes through D.C. amplifier transistor Q2.

When the amplitude of the input signal of equalizer 16 increases by a quantity $\Delta V1$ (see FIG. 1), the sampled signal at this output of the amplifier 24 varies by quantity $\delta V2$. Thus, the positive control signal V2 applied to the base of transistor Q1 is greater than normal i.e. V2 varies as a direct non-linear function of the variation in V1. Consequently, the current through the lamp is greater than normal resulting in an increased intensity beam, which causes a decrease in the photoresistance of element 17. As a result, the loss in the equalizer 16 is increased.

Let us call the resulting level variation in the equalizer "$\Delta a$." This variation, varies more than proportional with the variation of the output level V2;

$$\Delta a = -K\delta V2$$

$$K = F(\delta V2)$$

Thus:

$$\delta V2 = (\Delta 1 + K\delta V2)A$$

A=amplification of amplifier 24.

Hence:

$$\delta V2 = A\Delta V1 - AK\delta V2$$

Thus:

$$\delta V2 = \frac{A\Delta V1}{1+AK}$$

$$V2 = \frac{V1}{\frac{1}{A} + F(\delta V2)} \cong \frac{V1}{F(\delta V2)}$$

Because $F(\delta V2)$ varies strongly with $\delta V2$, the variation of the output level will be very small for considerable variation of the input level V1.

$$\delta V2 \ll \Delta V1$$

Thus, the voltage V2 is neither increased nor decreased in any significant amount because any variations of level V1 caused by variation of attenuation of the line feeding into the equalizer 13.

It should be noted that a capacitor C5 is connected between the collector and the base of transistor Q2. This capacitor acts as a final ripple filter and assures a more constant intensity output from lamp 19. Since the capacitor C5 provides negative feedback it also acts to prevent oscillation of the output circuitry and to make it insensitive to power variations caused by any voice signals. Stated another way, the circuit is only sensitive to carrier level variations.

The changes in equalizer output thus sensed at the output of the main amplifier in cable 11 is then used to equalize both cables 11 and 12. This is accomplished by having the light beam of lamp 19 impinge upon both photo sensitive resistors 17 and 17'. The photo sensitive resistors are integral parts of equalizers 16, 16' respectively. The equalizers can use any well known equalizer circuits, such as a Bode network or bridged T networks.

Figure 3:
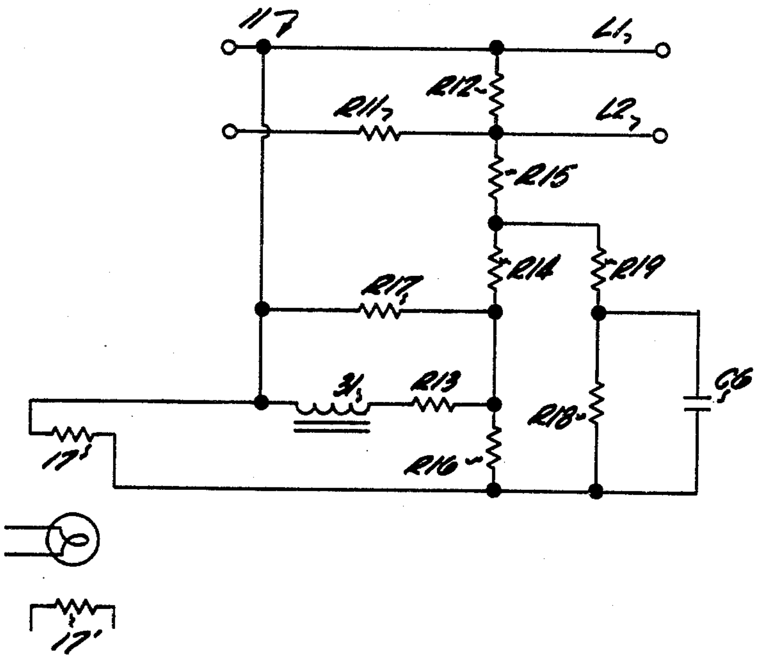
FIG. 3 is a schematic showing of an equalizer network controlled by the lamp circuit of FIG. 2.

The schematic of FIG. 3 shows the photo sensitive resistor 17 in a "Bode Equalization Network." The cable 11 is shown comprised of line L1, L2. The Bode network is well known to those skilled in the art. A description of such a network may be found in H. W. Bode, "Variable Equalizers," Bell System Technical Journal, April 1938. It is composed of resistor R11 in series with line L2 and resistor R12 bridging lines L1, L2. Inductor 31 in series with resistor R13 is connected across lines L1, L2 coupling to line 12 at the junction points of resistor R11, R12 through resistors R14, R15. The photo sensitive resistor 17 is connected in series with resistor R16 across the series circuit comprised of inductor L1, resistor R13. The series circuit of inductor 31, resistor R13 is also bridged by resistor R17.

A series combination of resistors R18, R19 is connected in parallel with resistors R13, R14. Resistor R18 is bridged by capacitor C6. It should be understood that while detail of a Bode equalization network is shown, any well known equalization network could be used in place of the Bode circuit. The key point is that the attenuation frequency characteristic must vary as a function of the changes in resistor element 17.

One preferred embodiment used the following typical values to obtain the desired results:

FEEDBACK CIRCUIT 22

| | | |
|---|---|---|
| C1 | μfd | 2.2 |
| P1 | ohms | 380–500 |
| B− | v | 18 |
| Q1 | | 2N2923 |
| Q2 | | 2N2923 |
| C2, C3, C4 | μfd | 3.3 |
| R1 | ohms | 39K |
| R2 | do | 24K |
| R3 | do | 6.8K |
| R4 | do | 6.8K |
| R5 | do | 20K |
| R6 | do | 510K |
| R7 | do | 39K |
| R8 | do | 3.3K |
| R9 | do | 43K |
| R10 | do | 4.3K |
| C5 | μfd | 100 |
| D1, D2, D3 | | IN270 |
| Lamp 19 | | [1] GE 44 |

T1, Thermistor: TT–2K (VEECO).

[1] Minimum base.

BODE NETWORK

Photosensitive Resistor 17, 17′—Clare Photocell No. CL. 504L

| | | |
|---|---|---|
| 31 | mh | 14 |
| C6 | μfd | 039 |
| R11 | ohms | 2100 |
| R12 | do | 4840 |
| R13 | do | 374 |
| R16, R14 | do | 600 |
| R15 | do | 140 |
| R17 | do | 2030 |
| R18 | do | 960 |
| R19 | do | 178 |

The lamp 19 is mounted in a container having both cells 17, 17′ mounted therein so as to receive equal amounts of light from the lamp. In a preferred embodiment the container comprises tubing one-half inch in diameter and three inches long. The lamp 19 is mounted through a hole in the middle of the tubing and the photo sensitive elements 17, 17′ are mounted at opposite ends. The tubing is filled with dry nitrogen and hermetically sealed. The dry nitrogen is used to prevent adverse effects which could result from condensation of humidity in the tube.

In operation, the equalizers 13, 13′ correct for the cable attenuation versus frequency slope at an average temperature. The equalizers 16, 16′ act as a vernier control to account for the variation in cable characteristics caused by aging and or changed ambient conditions.

The output of the main amplifier 24 of cable 11 is sampled. When there are changed ambient conditions the output of amplifier 24 reflects these changes. The sampled signal is used to control the intensity of lamp 19 which in turn controls the characteristics of both vernier equalizer circuits 16, 16′ by varying the resistance of elements 17, 17′ of these equalizer circuits. By proper design of the equalizer circuits, the change in the resistance of elements 17, 17′ will produce just the right amount of change in the attenuation versus frequency curve of the equalizers 16, 16′ to compensate for variations of cable characteristics. Thus, the change in cable characteristics is detected and used to control the attenuation equalization of both cables.

While the principles of the invention have been described above in connection with specific apparatus and applications, it is to be understood that this description is made only by way of example and not as a limitation on the scope of the invention.

I claim:

1. Transmission line cable systems comprising E–W and W–E transmission lines,
   repeaters in the transmission lines of the cable,
   said repeaters including equalizer circuits for maintaining the line impedance of the transmission lines constant at all frequencies of the transmission band,
   both of said equalizer circuits comprising an impedance network,
   each of said impedance networks further comprising individual photoresistor means,
   each of said photoresistor means having a resistance value that is similarly varied by the intensity of light impinging thereon,
   lamp means for providing said light,
   feedback means for energizing said lamp means by coupling said lamp means to the output of one of said equalizer means to vary the intensity of said light as a function of the output of said equalizer means, and
   said lamp means comprising a single lamp mounted to provide light impinging on each of said photoresistors to similarly vary the resistance of each of said photoresistors whereby each of said impedance networks acts to complement the line impedances over the transmission band.

2. The system of claim 1 wherein both of said equalizer circuits comprise first and second equalizers, and wherein the second equalizers include said photoresistor means to cause said second equalizers to act as vernier controls in conjunction with said first equalizers.

3. Transmission line cable systems having line repeaters therein that include equalizer circuitry for maintaining the line impedance of the transmission lines constant at all frequencies of the transmission band,
   said cable system including a first line for transmitting signals from east to west and a second line for transmitting signals from west to east in the same cable.
   said equalizer circuitry comprising a first and a second equalizer in said first line and a third and a fourth equalizer in said second line,
   means for connecting input signals to said first and third equalizers,
   means for obtaining output signals from said second and fourth equalizers, and
   said circuitry comprising photosensitive resistor means having resistance value that is varied by the intensity of light impinging thereon,
   lamp means for providing said light,
   feedback means for energizing said lamp means by coupling said lamp means to said output signals to vary the itensity of said light as a function of the amplitude or the output signals, and said photosensitive resistor means comprising a first photosensitive resistor connected to said second equalizer and a second photosensitive resistor connected to said fourth equalizer.

4. The system of claim 3 wherein said feedback means is connected only to the output signals from said second equalizer.

5. The system of claim 4 wherein the feedback signal transmitted back to said second and fourth equalizers through said feedback means, said lamp and said photo sensitive resistor is negative feedback.

References Cited

UNITED STATES PATENTS

| | | | |
|---|---|---|---|
| 2,758,281 | 8/1956 | Carleson | 179—170 |
| 2,825,764 | 3/1958 | Edwards et al. | 179—170.2 |
| 3,162,728 | 12/1964 | Pfister | 179—1.3 |

KATHLEEN H. CLAFFY, Primary Examiner

W. A. HELVESTINE, Assistant Examiner

U.S. Cl. X.R.

179—170.8